United States Patent
Corneli et al.

(10) Patent No.: US 7,546,398 B2
(45) Date of Patent: Jun. 9, 2009

(54) SYSTEM AND METHOD FOR DISTRIBUTING VIRTUAL INPUT/OUTPUT OPERATIONS ACROSS MULTIPLE LOGICAL PARTITIONS

(75) Inventors: Karyn T. Corneli, Austin, TX (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 11/461,461

(22) Filed: Aug. 1, 2006

(65) Prior Publication Data

US 2008/0126579 A1 May 29, 2008

(51) Int. Cl.
*G06F 3/00* (2006.01)
(52) U.S. Cl. .......................................... 710/38; 712/26
(58) Field of Classification Search .................... 710/38
See application file for complete search history.

(56) References Cited

U.S. PATENT DOCUMENTS

| | | | |
|---|---|---|---|
| 5,539,883 A * | 7/1996 | Allon et al. ................. 718/105 |
| 6,279,046 B1 * | 8/2001 | Armstrong et al. ............. 710/5 |
| 6,330,615 B1 | 12/2001 | Gioquindo et al. |
| 6,728,832 B2 * | 4/2004 | Yamamoto et al. .......... 711/114 |
| 6,738,886 B1 * | 5/2004 | Mendoza et al. ............ 711/173 |
| 6,963,915 B2 * | 11/2005 | Karger et al. ............... 709/226 |
| 7,051,188 B1 * | 5/2006 | Kubala et al. ................. 712/29 |
| 2005/0044228 A1 * | 2/2005 | Birkestrand et al. ......... 709/226 |
| 2006/0010031 A1 | 1/2006 | Higuchi et al. |

* cited by examiner

*Primary Examiner*—Henry W. H. Tsai
*Assistant Examiner*—Elias Mamo
(74) *Attorney, Agent, or Firm*—Yee & Associates, P.C.; William H. Steinberg; Rudolf O. Siegesmund

(57) ABSTRACT

The Distributed Virtual I/O Tool replaces dedicated VIO server LPARs by distributing the virtual I/O functions across several application LPARs connected by a high-speed communication channel. The physical I/O devices are distributed across available LPARs. The Distributed Virtual I/O Tool assigns each I/O request to an appropriate I/O device. The Distributed Virtual I/O Tool monitors each I/O request and reassigns I/O devices when performance drops on a specific device or when a device is no longer available.

1 Claim, 5 Drawing Sheets

SYSTEM AND METHOD FOR DISTRIBUTING VIRTUAL INPUT/OUTPUT OPERATIONS ACROSS MULTIPLE LOGICAL PARTITIONS

FIELD OF THE INVENTION

The invention relates generally to electrical computers and digital data processing, and specifically to selecting a path via which the computers will transfer data.

BACKGROUND OF THE INVENTION

The advent of logical partitions ("LPARs") in UNIX servers enabled mid-range servers to provide a class of service previously provided only by mainframe systems. Mainframe computers traditionally used physical partitioning to construct multiple "system images" using separate discrete building blocks. UNIX servers, using logical partitions, permitted finer granularity and interchangeability of components across system images. In addition, the virtualization of input/output ("I/O") devices across multiple partitions further enhanced logical partitioning functionality. Virtualization of I/O devices allows multiple logical partitions to share physical resources such as Ethernet adapters, disk adapters and so forth. Therefore, rather than dedicating these virtual I/O adapters to each logical partition, the adaptors are shared between partitions, where each LPAR uses only the I/O adaptors as needed.

Management of virtual I/O adapters requires a dedicated component acting on behalf of all resources. For example, a Virtual I/O server, or "VIO" server, may be created by forming a specialized LPAR dedicated to the task of possessing all shared I/O devices. The VIO server acts as a "virtual device" that fields input-output requests from all other LPARs. All of the shared I/O devices are physically attached to the VIO server. The IBM BladeCenter approaches virtual I/O management differently using a BladeCenter chassis that allows a virtual I/O to include fibre channel and Ethernet networking interface cards. While the BladeCenter does not rely on a dedicated LPAR to perform the virtualization, a dedicated processor is housed in the management blade of the chassis, that uses a dedicated VIO server to perform the virtualization.

Virtual I/O servers use software to seamlessly redirect input/output to an alternate device if a first device fails. By having access to multiple Ethernet adapters, for instance, the failure of any single physical adapter no longer deprives any given LPAR of Ethernet functionality. Instead, the VIO server provides the desired functionality to its client LPAR from another physical adapter.

The use of a central dedicated VIO server, however, puts all LPARs into a state of extreme dependence upon that single dedicated VIO server. For instance, if any failure mechanism, such as a processor problem or an operating system malfunction, manifests itself on the VIO server, all applications running on LPARs dependent upon that VIO server lose their ability to communicate through the I/O adaptors. In other words, the dedicated VIO server now becomes a single point of failure for all applications and LPARs using I/O adaptors.

One known solution to eliminate the single point-of-failure for a VIO server is to create redundant dedicated VIO LPARs. However, creation of redundant dedicated VIO LPARs unnecessarily consumes resources. For instance, each dedicated VIO LPAR requires processor and memory allocation, as well as disk space and other such resources, which would better be used running applications and performing direct value-added computations for users. Therefore, a need exists for a distributed VIO server that can operate across some or all of the application LPARs so that it is not subject to a single point of failure and that also does not duplicate computer resources.

SUMMARY OF THE INVENTION

The invention meeting the need identified above is the Distributed Virtual I/O Tool. The Distributed Virtual I/O Tool replaces dedicated VIO server LPARs by distributing the virtual I/O functions across several application LPARs connected by a high-speed communication channel. The Distributed Virtual I/O Tool receives an I/O request for an application running on a logical partition of a shared resource with a plurality of logical partitions, wherein I/O devices are physically distributed across the plurality of logical partitions. The Distributed Virtual I/O Tool assigns the I/O request to one of the I/O devices, wherein the I/O request can be assigned to any I/O device of the proper type attached to any logical partition, regardless of which logical partition runs the application receiving the I/O request, and sends the I/O request to the assigned I/O device.

Generally, each application or LPAR maps to a specific I/O device, binding the application or LPAR to the mapped device. If there is not a prior assignment, the Distributed Virtual I/O Tool assigns an I/O device when the I/O request is made. The Distributed Virtual I/O Tool monitors each I/O request and reassigns I/O devices when performance drops on a specific device or the LPAR connected to the device is no longer available. Assignment and reassignment of an I/O device may be based on the recommendation of an autonomic manager tasked with monitoring and managing the performance of the entire computer system. An alternate embodiment of the Distributed Virtual I/O Tool queries each I/O device manager for availability and performance data, and assigns or reassigns I/O devices based on the responses of the I/O device managers. Alternatively, the physical I/O devices may be distributed randomly across available LPARs such that LPARs with specific I/O needs may be given priority for a physical I/O device. In a further embodiment, a LPAR may have a dedicated I/O device, and will not share the Virtual I/O Tool.

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

Figure 4:
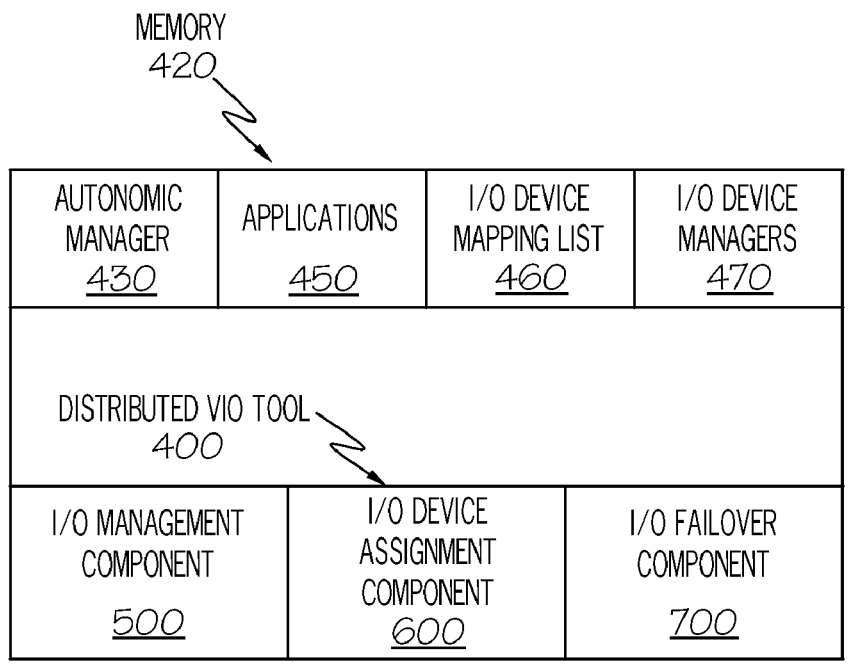
Figure 5:
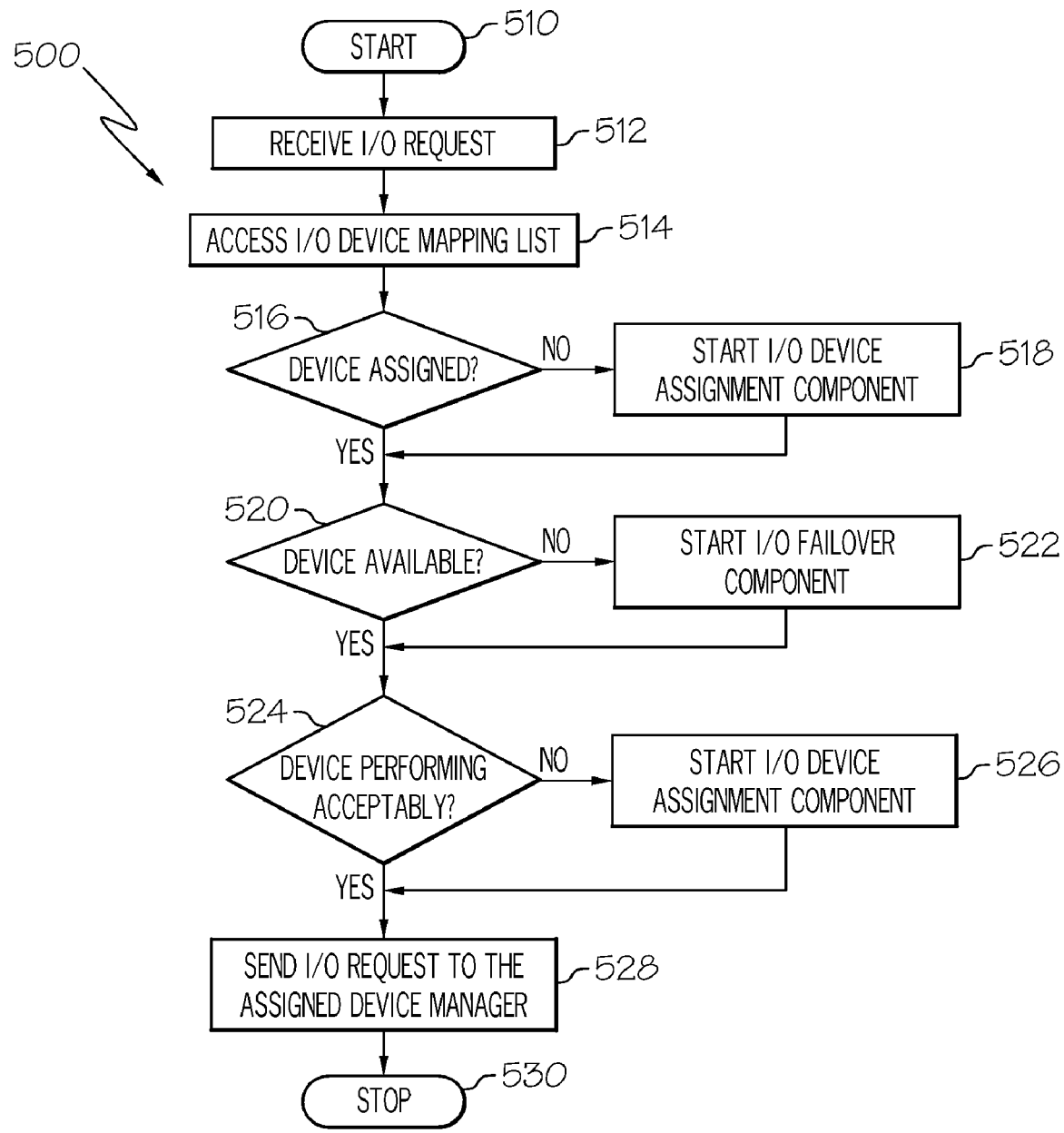
Figure 6:
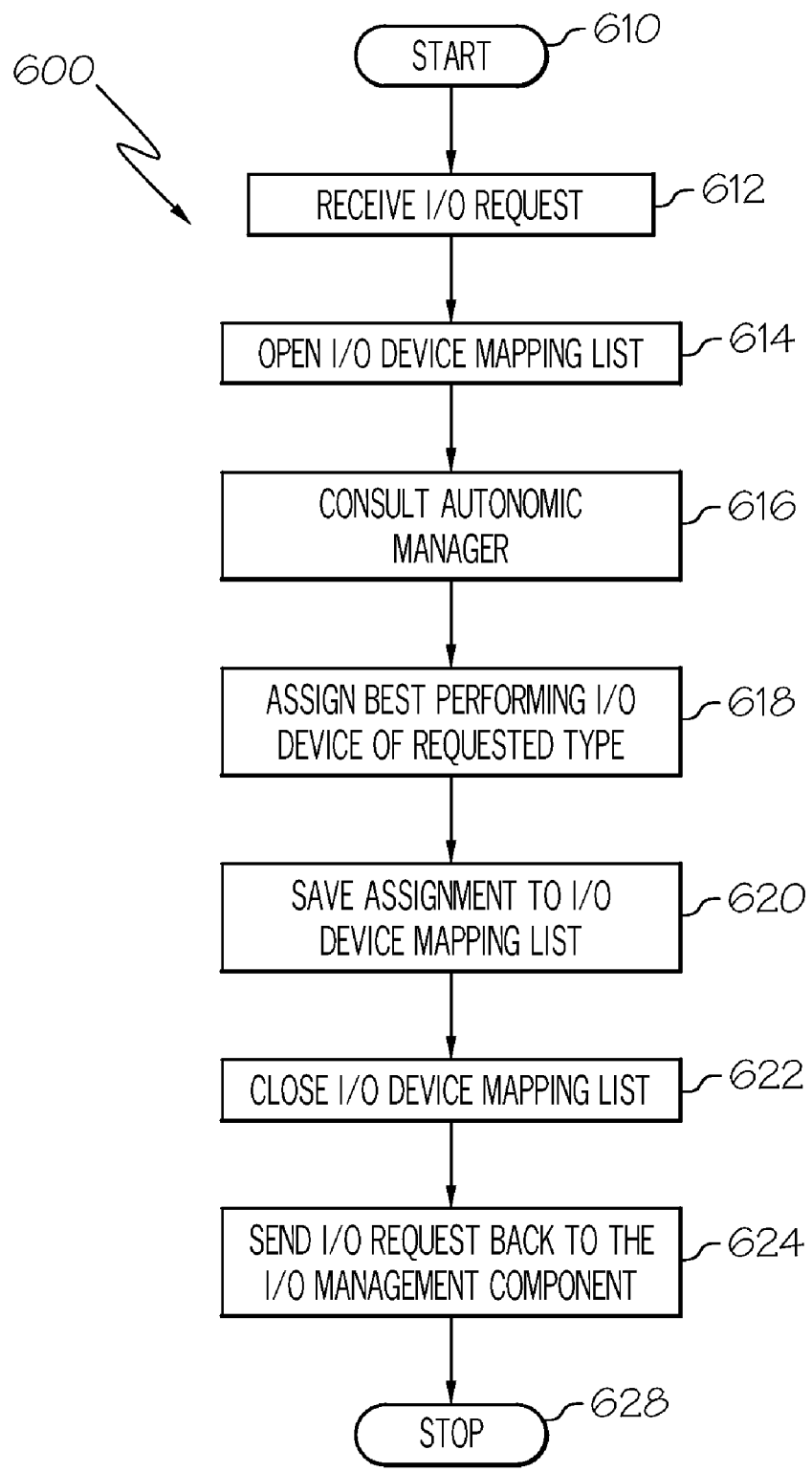

FIG. 4 describes programs and files in a memory on a computer;

FIG. 5 is a flowchart of an I/O Management Component;

FIG. 6 is a flowchart of an I/O Device Assignment Component; and

Figure 7:
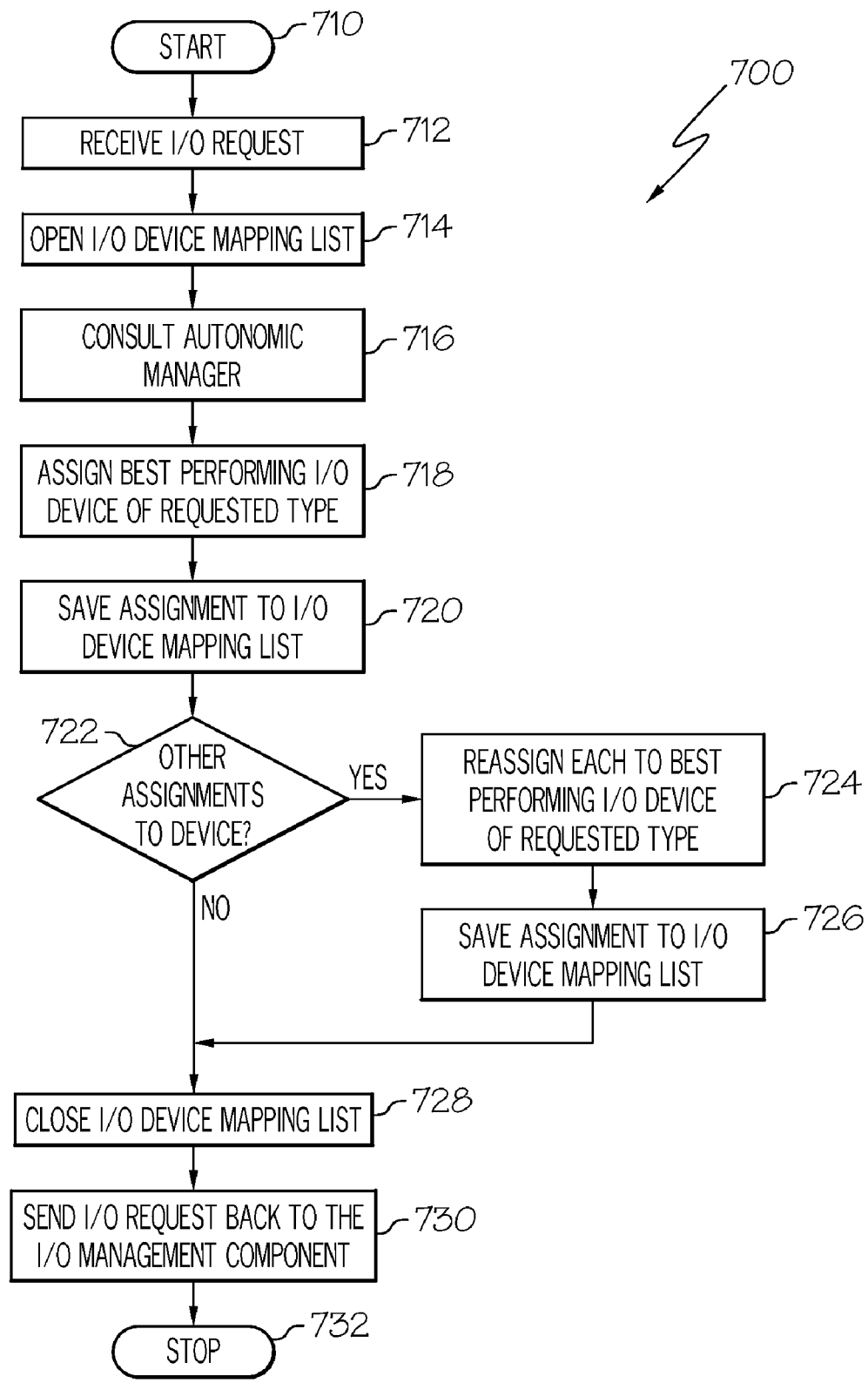

FIG. 7 is a flowchart of an I/O Failover Component.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Distributed Virtual I/O Tool"

Figure 1:
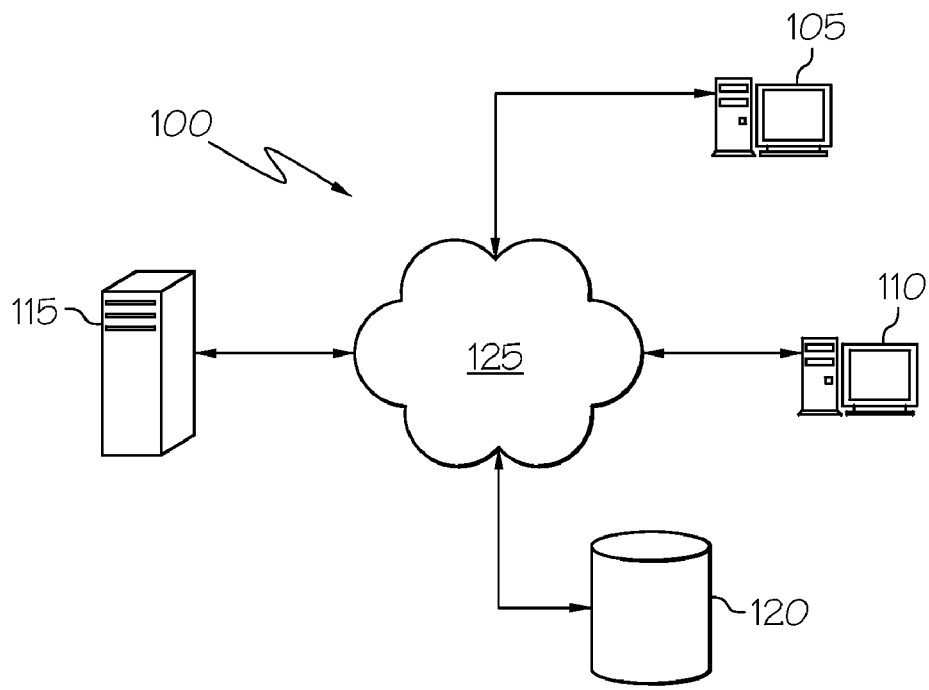
FIG. 1 is an exemplary computer network.

Additionally, the Distributed Virtual I/O Tool is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
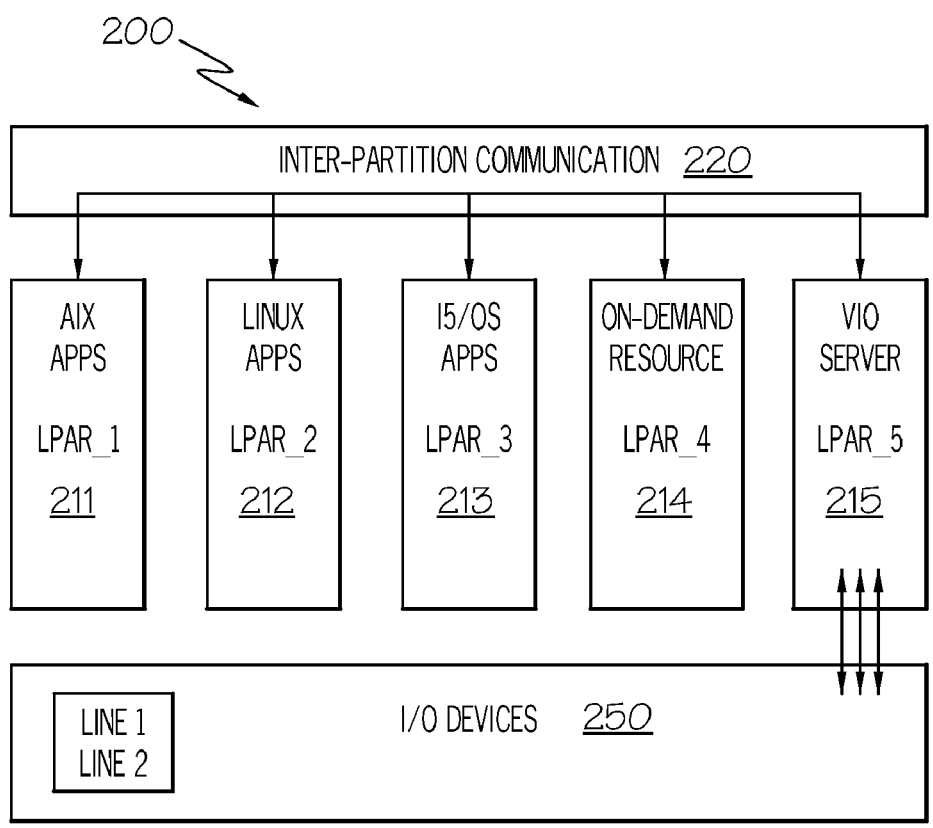
FIG. 2 is a diagram of an exemplary shared resource with a dedicated VIO LPAR.

A computer with multiple logical partitions, known as a shared resource, is shown in FIG. 2. Shared Resource 200 is an example of the prior art method of providing a VIO server on a dedicated logical partition, or LPAR. Shared Resource 200 has several LPARs connected by Inter-Partition Communication 220, a high-speed communication system linking all the LPARs, such as the POWER HYPERVISOR product from IBM. LPAR_1 211 runs applications on an AIX operating system. LPAR_2 212 runs applications on a LINUX operating system. LPAR_3 213 runs applications on an i5 operating system. LPAR_4 214 has unassigned resources available for increases in demands for computing resources. LPAR_5 215 is the VIO LPAR and physically connects to all the available I/O devices such as Ethernet adaptors, fibre channels and persistent storage media. Each application LPAR (211-214) accesses I/O devices 250 via Inter-Partition Communication 220 and VIO server LPAR 215.

Figure 3:
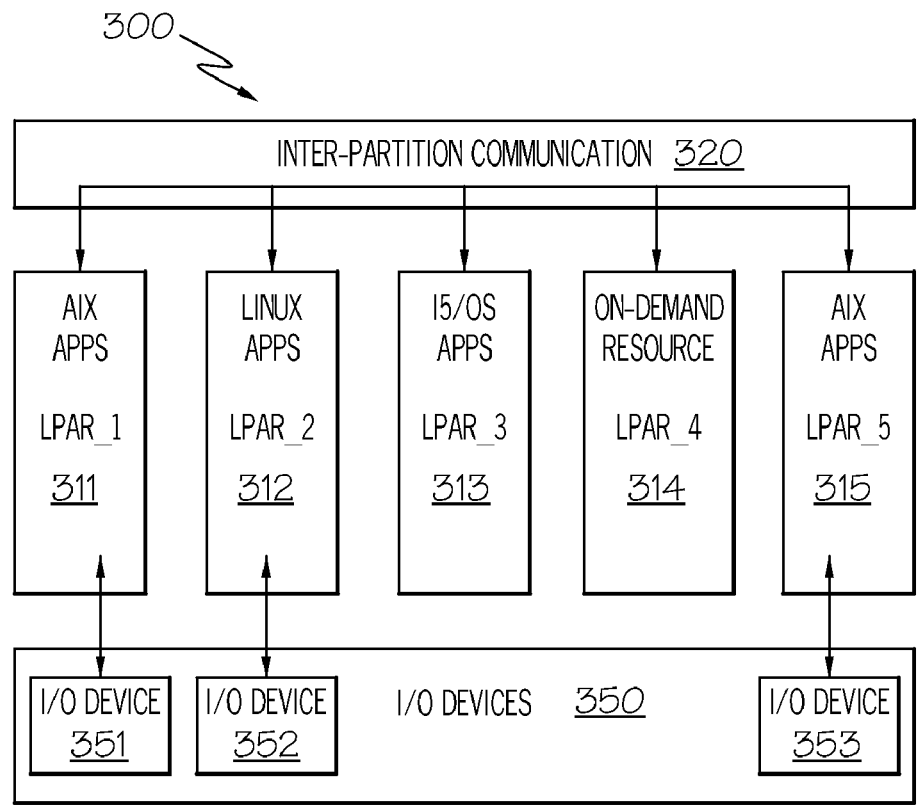
FIG. 3 is a diagram of a shared resource with a distributed VIO tool.

FIG. 3 depicts Improved Shared Resource 300 using a VIO server distributed across several LPARs. The LPARs on Improved Shared Resource 300 are connected by Inter-Partition Communication 320, just as the prior art in FIG. 2. LPAR_1 311 and LPAR_5 315 run applications on an AIX operating system. LPAR_2 312 runs applications on a LINUX operating system. LPAR_3 313 runs applications on an i5 operating system. LPAR_4 314 has unassigned resources available for increases in demands for computing resources. Distributed VIO Tool 400 runs on any of the LPARs, as part of the overall server management software. LPARs 311, 312 and 315 are physically connected to I/O devices 351, 352 and 353 respectively. Each LPAR (311-315) can access any of I/O devices 350 via Inter-Partition Communication 320 and the direct I/O connections through LPARs 311, 312 and 315. In an embodiment of the invention, LPAR 311, 312 or 315 may have a dedicated I/O device that is not shared by the other LPARs.

Distributed VIO Tool 400 typically is stored in a memory, represented schematically as memory 420 in FIG. 4. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 4 is included merely as a descriptive expedient and does not necessarily reflect any particular physical embodiment of memory 420. As depicted in FIG. 2, though, memory 420 may include additional data and programs. Of particular import to Distributed VIO Tool 400, memory 420 may include Autonomic Manager 430, Applications 450, I/O Device Mapping List 460, and I/O Device Managers 470 with which Distribute VIO Tool 400 interacts. Additionally, Distributed VIO Tool 400 has three components: I/O Management Component 500, I/O Device Assignment Component 600 and I/O Failover Component 700.

Autonomic Manager 430 continuously monitors and analyzes the computer system to ensure the system operates smoothly. One major function known in the art for Autonomic Manager 430 is load balancing so that system resources are efficiently used by applications on the server. Applications 450 are the functional programs performing tasks for users on the server. Examples of Applications 450 include such things as databases, Internet sites, accounting software and e-mail service. I/O Device Mapping List 460 is a file that maps various applications and LPARs to specific I/O devices using bindings. I/O Device Mapping List 460 may also include other configuration preferences such as a performance threshold for I/O devices or a preferred priority for assigning certain applications to an I/O device. I/O Device Managers 470 are programs that configure and operate the physical I/O devices.

As shown in FIG. 5, I/O Management Component 500 starts whenever an I/O request is made for one of Applications 450 on shared resource 300 (510). I/O Management Component 500 receives the I/O request (512) and accesses I/O Device Mapping List 460 (514). I/O Management Component 500 determines if an I/O device has been assigned to the application or LPAR that made or received the I/O request (516). If an I/O device is not assigned, I/O Management Component 500 starts I/O Device Assignment Component 600 (518). If an I/O device is already assigned, or after assigning an I/O device, I/O Management Component 500 determines if the assigned I/O device is available (520). If the assigned I/O device is not available, I/O Management Component 500 starts I/O Failover Component 700 (522). After insuring that the I/O request is assigned to an available I/O device, I/O Management Component 500 determines whether the assigned I/O device is performing at an acceptable level (524). Performance thresholds may be set in I/O device mapping list 460, or may come from another source, such as Autonomic Manger 430. If the I/O device performance is not acceptable, I/O Management Component 500 starts I/O Device Assignment Component 600 (526). Once an I/O request is assigned to an available, acceptable I/O device, the I/O Management Component 500 sends the I/O request to the assigned I/O device manager 470 (528) and I/O Management Component 500 stops (530).

FIG. 6 shows that I/O Device Assignment Component 600 starts when initiated by I/O management Component 500

(610). I/O Device Assignment Component 600 reads the I/O request (612) and opens I/O Device Mapping List 460 (614). I/O Device Assignment Component 600 consults Autonomic Manager 430 to identify performance metrics of available I/O devices (616). I/O Device Assignment Component 600 assigns the I/O request to the best performing I/O device of the type needed by the I/O request (618). The assignment of the I/O device may also be influenced by priority preferences stored in I/O Device Mapping List 460. I/O Device Assignment Component 600 saves the assignment to I/O Device Mapping List 460 (620) so that subsequent requests in the session will already be assigned. Using bindings to link a request to a specific I/O device allows the client to encapsulate the assignment in subsequent requests in the session. I/O Device Assignment Component 600 closes I/O Device Mapping List 460 (622), sends the I/O request and assignment back to I/O Management Component 500 (624) and stops (628).

An alternate embodiment of I/O Device Assignment Component 600 (not shown) does not consult Autonomic Manager 430 or another centralized tracking and tuning program to make I/O device assignments. Instead, the alternate embodiment queries each I/O device manager 470 individually, then makes the assignment based on the responses of each I/O device manager 470.

I/O Failover Component 700, shown in FIG. 7, starts when initiated by I/O management Component 500 (710). I/O Failover Component 700 is initiated whenever an I/O request is assigned to a failed or unavailable I/O device. An I/O device may become unavailable because the I/O device itself failed or the LPAR connected to the I/O device has failed. I/O Failover Component 700 receives the I/O request (712) and opens I/O Device Mapping List 460 (714). I/O Failover Component 700 consults Autonomic Manager 430 to identify performance metrics of available I/O devices (716). I/O Failover Component 700 assigns the I/O request to the best performing I/O device of the type needed by the I/O request (718). The assignment of the I/O device may also be influenced by priority preferences stored in I/O Device Mapping List 460. I/O Failover Component 700 saves the assignment to I/O Device Mapping List 460 (720) so that subsequent requests in the session will already be assigned. Using bindings to link a request to a specific I/O device allows the client to encapsulate the assignment in subsequent requests in the session. I/O Failover Component 700 determines if any other applications, LPARs or sessions are assigned to the failed device (722) by reviewing bindings stored in I/O Device Mapping List 460. If other assignments to the failed device are identified, I/O Failover Component 700 assigns future I/O requests for the application or LPAR to the best performing I/O device (724) and saves the assignment to I/O Device Mapping List 460 (726). After reassigning I/O requests, I/O Failover Component 700 closes I/O Device Mapping List 460 (728), sends the I/O request and assignment back to I/O Management Component 500 (730) and stops (732).

As with I/O Device Assignment Component 600, an alternate embodiment of I/O Failover Component 700 (not shown) does not consult Autonomic Manager 430 or another centralized tracking and tuning program to determine I/O device assignments. Instead, the alternate embodiment queries each I/O device manger 470 individually and then makes the assignment based on the responses of each I/O device manger 470.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for accessing a plurality of input/output (I/O) devices physically distributed across a plurality of logical partitions (LPARs) without a single point of failure comprising:

creating a distributed virtual input/out (VIO) server by running a VIO tool on each LPAR of the plurality of LPARs;

wherein each LPAR is operable to access the plurality of I/O devices using inter-partition communication and each LPAR is operable to access an I/O device to which it is directly connected;

wherein each LPAR is mapped to a dedicated I/O device that is not shared with the plurality of LPARs;

wherein each VIO tool performs steps comprising:

receiving an I/O request from an application by a VIO tool;

assigning the I/O request to one of the plurality of I/O devices, wherein the I/O request is assigned to any I/O device of a proper type attached to any LPAR, regardless of which LPAR runs the application;

wherein types of I/O devices comprise Ethernet adaptors, disk adaptors, fibre channels and persistent storage media;

accessing an I/O Device Mapping List, that maps applications and LPARs to the plurality of I/O devices using bindings;

consulting an Autonomic Manager to assign the I/O request to a preferred I/O device, wherein the preferred I/O device is one performing at an acceptable level;

sending the I/O request to the assigned I/O device;

binding the I/O request to the assigned I/O device wherein an assignment of the assigned I/O device is encapsulated in one or more subsequent requests of a client/server session;

saving the assignment to the I/O Device Mapping List;

responsive to a failure of a previously assigned I/O device or to a failure of the LPAR mapped to the I/O device, reassigning one or more subsequent I/O requests in the client/server session to another I/O device; and saving the reassigned I/O request to the I/O Device Mapping List;

wherein a plurality of input/output (I/O) devices physically distributed across a plurality of logical partitions (LPARs) are accessible without a single point of failure.

* * * * *